United States Patent
Osanai et al.

(10) Patent No.: US 9,916,672 B2
(45) Date of Patent: Mar. 13, 2018

(54) BRANCHING AND MERGING DETERMINATION APPARATUS

(71) Applicant: DENSO CORPORATION, Kariya, Aichi-pref. (JP)

(72) Inventors: Satoshi Osanai, Obu (JP); Naoki Kawasaki, Kariya (JP); Syunya Kumano, Gothenburg (SE)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/789,663

(22) Filed: Jul. 1, 2015

(65) Prior Publication Data

US 2016/0003628 A1  Jan. 7, 2016

(30) Foreign Application Priority Data

Jul. 4, 2014 (JP) ................ 2014-138753

(51) Int. Cl.
| | |
|---|---|
| *G01C 21/26* | (2006.01) |
| *G01S 13/02* | (2006.01) |
| *G06T 11/60* | (2006.01) |
| *G06K 9/00* | (2006.01) |
| *G01S 13/93* | (2006.01) |
| *G01C 21/36* | (2006.01) |

(52) U.S. Cl.
CPC ......... *G06T 11/60* (2013.01); *G01C 21/3602* (2013.01); *G01S 13/931* (2013.01); *G06K 9/00798* (2013.01)

(58) Field of Classification Search
CPC .... G01C 21/26; G01S 13/02; G06K 9/00798; G06K 9/007989; G06T 11/60
See application file for complete search history.

(56) References Cited

U.S. PATENT DOCUMENTS

| | | | |
|---|---|---|---|
| 2002/0016663 A1 | 2/2002 | Nakamura et al. | |
| 2002/0032515 A1 | 3/2002 | Nakamura et al. | |
| 2005/0090950 A1* | 4/2005 | Sawamoto | G08G 1/166 701/23 |
| 2007/0142994 A1* | 6/2007 | Boecker | B60K 31/04 701/93 |

(Continued)

FOREIGN PATENT DOCUMENTS

| | | |
|---|---|---|
| JP | H07334790 | 12/1995 |
| JP | 2005-173917 | 6/2005 |

(Continued)

*Primary Examiner* — Yonel Beaulieu
*Assistant Examiner* — Martin Weeks
(74) *Attorney, Agent, or Firm* — Knobbe, Martens, Olson & Bear, LLP

(57) ABSTRACT

A branching and merging determination apparatus includes a recognizer and a determiner. The recognizer recognizes a target present in front of an own vehicle. The determiner determines, based on a result of the recognition of the target by the recognizer, presence or absence of branching and merging of roads. Specifically, the determiner is configured to: estimate a traveling section where branching or merging of roads is probably present; and determine that no branching or merging of roads is present in a region of the estimated traveling section where there is a preceding vehicle traveling at a higher speed than the own vehicle.

30 Claims, 3 Drawing Sheets

(56) References Cited

U.S. PATENT DOCUMENTS

| | | | |
|---|---|---|---|
| 2010/0161192 A1* | 6/2010 | Nara | B60W 10/06 |
| | | | 701/70 |
| 2010/0246889 A1 | 9/2010 | Nara et al. | |
| 2011/0137535 A1* | 6/2011 | Goto | B60T 1/10 |
| | | | 701/70 |
| 2011/0184622 A1* | 7/2011 | Yamada | B60K 6/46 |
| | | | 701/99 |
| 2012/0140039 A1* | 6/2012 | Ota | B60W 30/12 |
| | | | 348/46 |
| 2012/0283942 A1* | 11/2012 | T'Siobbel | G01C 21/26 |
| | | | 701/410 |
| 2013/0179379 A1* | 7/2013 | Kurumisawa | G06N 5/02 |
| | | | 706/46 |

FOREIGN PATENT DOCUMENTS

| | | |
|---|---|---|
| JP | 2006-164197 | 6/2006 |
| JP | 2008-268157 | 11/2008 |
| JP | 2009-035213 | 2/2009 |
| JP | 2010-023721 | 2/2010 |
| JP | 2010-221859 | 10/2010 |
| JP | 2011-025895 | 2/2011 |
| JP | 2011-198110 | 10/2011 |
| JP | 2012-214124 | 11/2012 |
| JP | 2014-021051 | 2/2014 |

\* cited by examiner

BRANCHING SCENE WHERE THERE IS DASHED LINE OF UNEVEN THICKNESS

BRANCHING SCENE WHERE LANE BOUNDARY LINE IS ABSENT

BRANCHING AND MERGING DETERMINATION APPARATUS

CROSS-REFERENCE TO RELATED APPLICATION

This application is based on and claims priority from Japanese Patent Application No. 2014-138753 filed on Jul. 4, 2014, the content of which is hereby incorporated by reference in its entirety into this application.

BACKGROUND

1. Technical Field

The present invention relates to apparatuses that determine the presence or absence of branching and merging of roads.

2. Description of the Related Art

Japanese Patent Application Publication No. JP2009035213A (to be referred to as Patent Document 1 hereinafter) discloses a lane departure prevention apparatus that prevents departure of a vehicle from its traveling lane. Specifically, the apparatus sets, based on navigation information, a traveling section where the probability of the vehicle changing its traveling lane is high. Further, the apparatus determines a direction in which the tendency for the vehicle to depart from its traveling lane in the set traveling section is high. When the probability of the vehicle changing its traveling lane in the determined direction is high, the apparatus suppresses a lane departure prevention control from being performed. In contrast, when the probability of the vehicle changing its traveling lane in the determined direction is low, the apparatus allows the lane departure prevention control to be normally performed so as to prevent the vehicle from departing from its traveling lane in the determined direction.

Japanese Patent Application Publication No. JP2010221859A (to be referred to as Patent Document 2 hereinafter) discloses a vehicle driving support system that identifies the traveling lane of a vehicle in real time and controls driving of the vehicle based on the identified traveling lane. Specifically, the system includes a camera, a white line type recognition unit, a white line type storage unit, a white line type estimation unit and a controller. The camera captures images of a road on which the vehicle travels. The white line type recognition unit recognizes, based on the images captured by the camera, the type of a white line which defines the traveling lane of the vehicle. The white line type storage unit stores therein the white line type recognized by the white line type recognition unit. The white line type estimation unit estimates, when the current white line type cannot be recognized by the white line type recognition unit, the current white line type based on the past white line type stored in the white line type storage unit. The controller controls driving of the vehicle based on the current white line type recognized by the white line type recognition unit or estimated by the white line type estimation unit.

However, it is impossible for both the lane departure prevention apparatus disclosed in Patent Document 1 and the vehicle driving support system disclosed in Patent Document 2 to accurately determine the presence or absence of branching and merging of roads.

SUMMARY

According to one exemplary embodiment, there is provided a first branching and merging determination apparatus which includes a recognizer and a determiner. The recognizer recognizes a target present in front of an own vehicle. The determiner determines, based on a result of the recognition of the target by the recognizer, presence or absence of branching and merging of roads. Specifically, the determiner is configured to: estimate a traveling section where branching or merging of roads is probably present; and determine that no branching or merging of roads is present in a region of the estimated traveling section where there is a preceding vehicle traveling at a higher speed than the own vehicle.

According to the exemplary embodiment, there is also provided a second branching and merging determination apparatus which includes a recognizer and a determiner. The recognizer recognizes a target present in front of an own vehicle. The determiner determines, based on a result of the recognition of the target by the recognizer, presence or absence of branching and merging of roads. Specifically, the determiner is configured to: estimate a traveling section where branching or merging of roads is probably present; and determine that no branching or merging of roads is present in a region of the estimated traveling section where there is an oncoming vehicle traveling in a direction opposite to the traveling direction of the own vehicle According to the exemplary embodiment, there is also provided a third branching and merging determination apparatus which includes a recognizer and a determiner. The recognizer recognizes a target present in front of an own vehicle. The determiner determines, based on a result of the recognition of the target by the recognizer, presence or absence of branching and merging of roads. Specifically, the determiner is configured to: estimate a traveling section where branching or merging of roads is probably present; and determine that branching or merging of roads is present in a region of the estimated traveling section where there is a lane boundary line not parallel to the traveling direction of the own vehicle.

According to the exemplary embodiment, there is also provided a fourth branching and merging determination apparatus which includes a recognizer and a determiner. The recognizer recognizes a target present in front of an own vehicle. The determiner determines, based on a result of the recognition of the target by the recognizer, presence or absence of branching and merging of roads. Specifically, the determiner is configured to: estimate a traveling section where branching or merging of roads is probably present; and determine that branching of roads is present in a region of the estimated traveling section where the distance between two adjacent preceding vehicles in the left-right direction is greater than a predetermined value.

According to the exemplary embodiment, there is also provided a fifth branching and merging determination apparatus which includes a recognizer and a determiner. The recognizer recognizes a target present in front of an own vehicle. The determiner determines, based on a result of the recognition of the target by the recognizer, presence or absence of branching and merging of roads. Specifically, the determiner is configured to: estimate a traveling section where branching or merging of roads is probably present; and determine that merging of roads is present in a region of the estimated traveling section where the distance between two adjacent preceding vehicles in the left-right direction is less than a predetermined value.

Consequently, with the first to the fifth branching and merging determination apparatuses, it is possible to accurately determine the presence or absence of branching and merging of roads by specifying the determination conditions in detail based on the result of the recognition of the target present in front of the own vehicle.

In further implementations, the determiner may estimate a traveling section where there is a dashed line of uneven thickness drawn on a road surface as the traveling section where branching or merging of roads is probably present. Alternatively, the determiner may estimate a traveling section where a lane boundary line is absent as the traveling section where branching or merging of roads is probably present. Still alternatively, the determiner estimates, as the traveling section where branching or merging of roads is probably present, a traveling section that extends forward by a predetermined distance from a place where branching or merging of roads is detected.

The first to the fifth branching and merging determination apparatuses may further include an in-vehicle camera configured to capture an image of an environment of the own vehicle. In this case, the recognizer may recognize the target present in front of the own vehicle based on the image captured by the in-vehicle camera.

Alternatively, the first to the fifth branching and merging determination apparatuses may further include an in-vehicle radar configured to detect information about an environment of the own vehicle. In this case, the recognizer may recognize the target present in front of the own vehicle based on the information detected by the in-vehicle radar.

BRIEF DESCRIPTION OF THE DRAWINGS

The present invention will be understood more fully from the detailed description given hereinafter and from the accompanying drawings of one exemplary embodiment, which, however, should not be taken to limit the invention to the specific embodiment but are for the purpose of explanation and understanding only.

In the accompanying drawings.

DESCRIPTION OF EMBODIMENT

Figure 1:
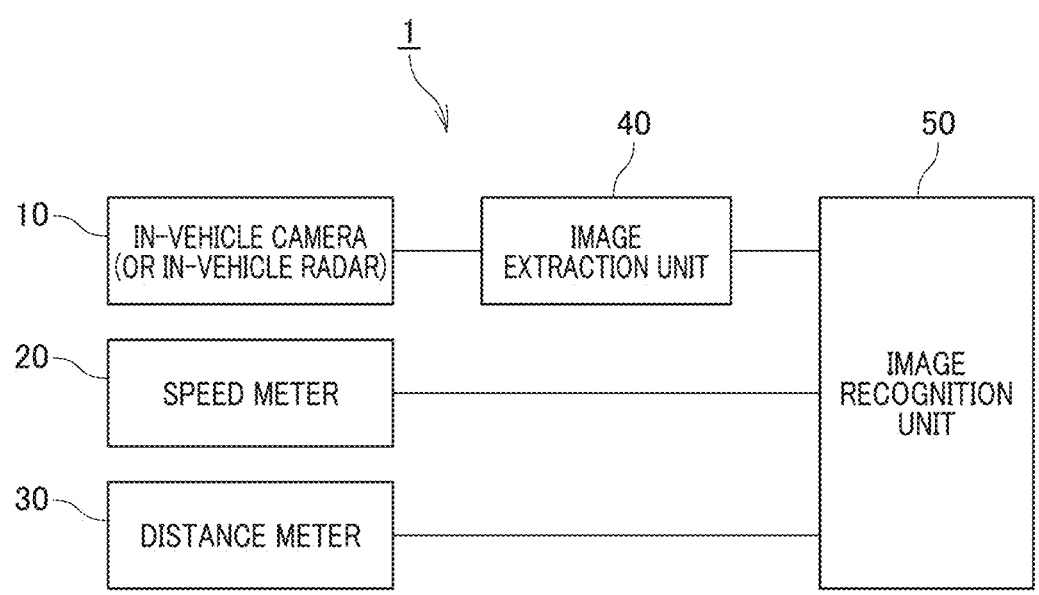
FIG. 1 is a functional block diagram illustrating the overall configuration of a branching and merging determination apparatus according to an exemplary embodiment.

FIG. 1 shows the overall configuration of a branching and merging determination apparatus 1 according to an exemplary embodiment. The branching and merging determination apparatus 1 is designed to be used in a motor vehicle (to be referred to as own vehicle hereinafter).

As shown in FIG. 1, the branching and merging determination apparatus 1 includes an in-vehicle camera 10, a speed meter 20, a distance meter 30, an image extraction unit 40 and an image recognition unit 50.

The in-vehicle camera 10 is configured to capture images of an environment of the own vehicle (e.g., an area in front of the own vehicle).

The speed meter 20 is configured to measure the traveling speed of the own vehicle.

The distance meter 30 is configured to measure the traveling distance of the own vehicle.

The image extraction unit 40 is a processor for image processing. The image extraction unit 40 is configured to extract targets (or objects) present in front of the own vehicle from the images of the environment of the own vehicle captured by the in-vehicle camera 10. In addition, the targets extracted by the image extraction unit 40 may include lane boundary lines, road signs or demarcation lines drawn on a road surface, and a preceding vehicle or an oncoming vehicle present in front of the own vehicle.

The image recognition unit 50 includes a CPU (Central Processing Unit), a ROM (Read Only Memory), a RAM (Random Access Memory) and I/O (Input/Output) devices, none of which are shown in the figures. The image recognition unit 50 is configured to recognize the targets extracted by the image extraction unit 40.

Moreover, based on the recognition results of the targets, the image recognition unit 50 further determines the presence or absence of branching and merging of roads as follows.

Figure 2:
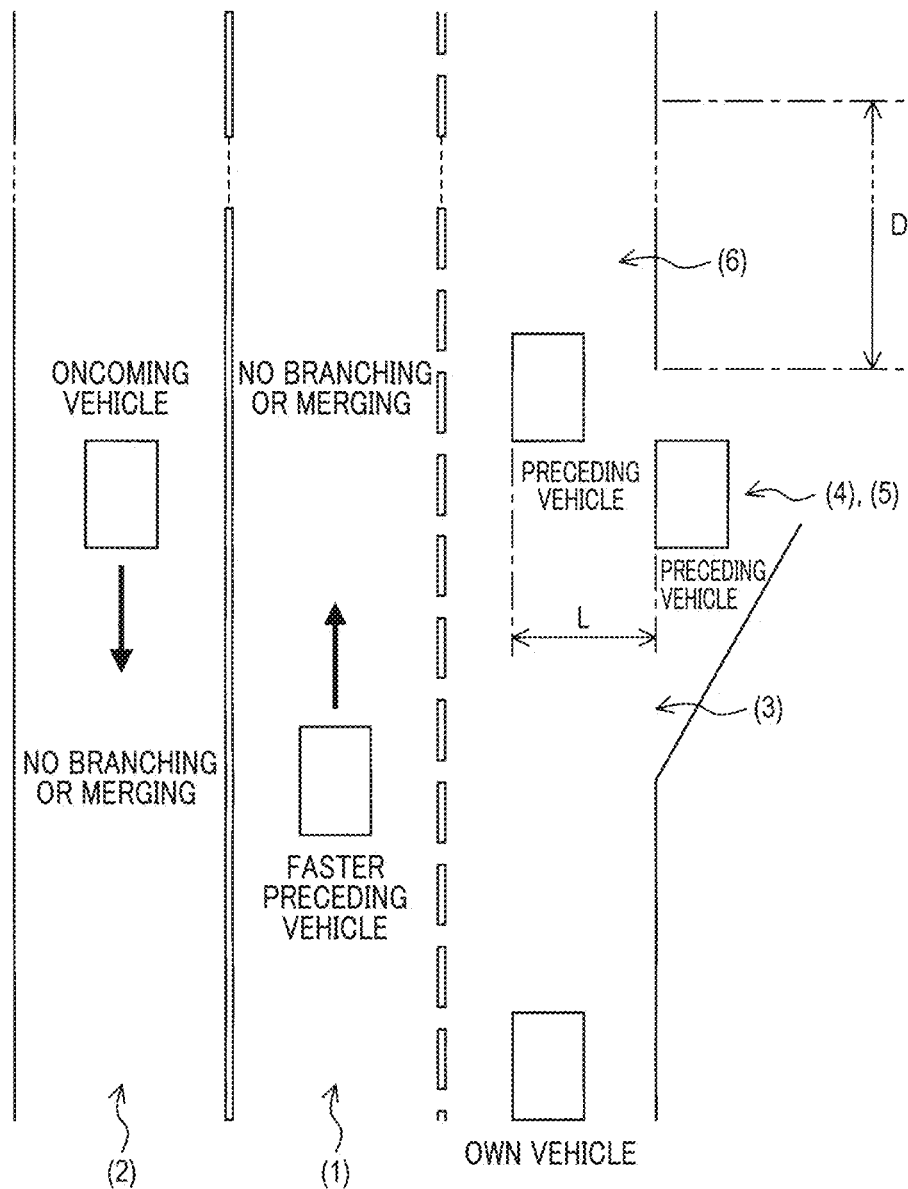
FIG. 2 is a schematic view illustrating a branching and merging determination process performed by the apparatus.

(1) The image recognition unit 50 estimates a traveling section where branching or merging of roads is probably present. Then, the image recognition unit 50 determines that no branching or merging of roads is present in a region of the estimated traveling section where there is a preceding vehicle traveling at a higher speed than the own vehicle (i.e., the region (1) in FIG. 2).

Figure 3A:
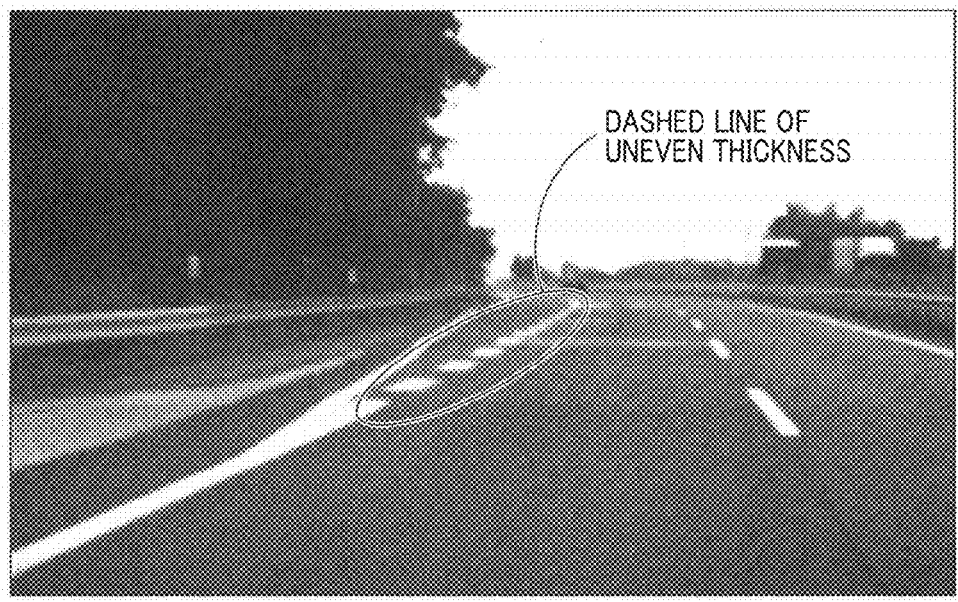
FIG. 3A is another schematic view illustrating the branching and merging determination process.
Figure 3B:
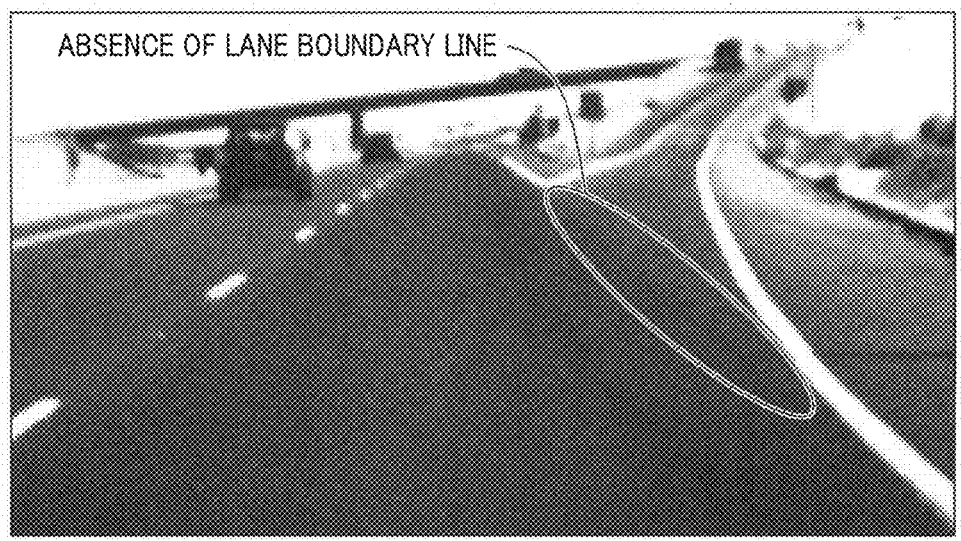
FIG. 3B is yet another schematic view illustrating the branching and merging determination process.

In addition, a traveling section where there is a dashed line of uneven thickness drawn on the road surface as illustrated in FIG. 3A or a traveling section where a lane boundary line is absent as illustrated in FIG. 3B may be estimated as the traveling section where branching or merging of roads is probably present.

(2) The image recognition unit 50 estimates a traveling section where branching or merging of roads is probably present. Then, the image recognition unit 50 determines that no branching or merging of roads is present in a region of the estimated traveling section where there is an oncoming vehicle traveling in a direction opposite to the traveling direction of the own vehicle (i.e., the region (2) in FIG. 2).

(3) The image recognition unit 50 estimates a traveling section where branching or merging of roads is probably present. Then, the image recognition unit 50 determines that branching or merging of roads is present in a region of the estimated traveling section where there is a lane boundary line not parallel to the traveling direction of the own vehicle (i.e., the region (3) in FIG. 2).

(4) The image recognition unit 50 estimates a traveling section where branching or merging of roads is probably present. Then, the image recognition unit 50 determines that branching of roads is present in a region of the estimated traveling section where the distance L between two adjacent preceding vehicles in the left-right direction (or the direction perpendicular to the traveling direction of the own vehicle) is greater than a first predetermined value (i.e., the region (4) in FIG. 2). In addition, the first predetermined value is set in advance via an experiment.

(5) The image recognition unit 50 estimates a traveling section where branching or merging of roads is probably present. Then, the image recognition unit 50 determines that merging of roads is present in a region of the estimated traveling section where the distance L between two adjacent preceding vehicles in the left-right direction is less than a second predetermined value (i.e., the region (5) in FIG. 2). In addition, the second predetermined value is set in advance via an experiment.

It should be noted that the first and second predetermined values may be set to be equal to or different from each other.

(6) The image recognition unit 50 detects branching or merging of roads at a place. Then, the image recognition unit 50 estimates that branching or merging of roads is present in a next traveling section that extends forward by a predetermined distance D from the place where branching or merging of roads is detected (i.e., the section designated by (6) in FIG. 2). In addition, the predetermined distance D is set in advance via an experiment.

More specifically, upon detection of branching of roads at a place, the image recognition unit 50 estimates that merging of roads is present in the next traveling section that extends forward by the predetermined distance D from the place. In contrast, upon detection of merging of roads at a place, the image recognition unit 50 estimates that branching of roads is present in the next traveling section that extends forward by the predetermined distance D from the place.

As described above, the branching and merging determination apparatus 1 according to the present embodiment can accurately determine the presence or absence of branching and merging of roads by specifying the determination conditions in detail based on the recognition results of the targets present in front of the own vehicle.

While the above particular embodiment has been shown and described, it will be understood by those skilled in the art that various modifications, changes, and improvements may be made without departing from the spirit of the present invention.

For example, in the above embodiment, the branching and merging determination apparatus 1 includes the in-vehicle camera 10 configured to capture the images of the environment of the own vehicle; and the targets present in front of the own vehicle are recognized based on the images captured by the in-vehicle camera 10.

However, the branching and merging determination apparatus 1 may include, instead of the in-vehicle camera 10, an in-vehicle radar (see FIG. 1) configured to detect information about the environment of the vehicle; and the targets present in front of the own vehicle may be recognized based on the information detected by the in-vehicle radar.

In the above embodiment, the branching and merging determination apparatus 1 includes the image recognition unit 50 that functions both as a recognizer to recognize the targets present in front of the own vehicle and as a determiner to determine the presence or absence of branching and merging of roads.

However, the branching and merging determination apparatus 1 may further include a dedicated determination unit in addition to the image recognition unit 50. In this case, the determination unit functions to determine the presence or absence of branching and merging of roads based on the results of the recognition of the targets by the image recognition unit 50.

What is claimed is:

1. A branching and merging determination apparatus comprising:
   an image extraction unit having a processor that images an environment of an own vehicle and output an imaging result;
   a target object recognition unit having a processor that recognizes a target object present in front of an own vehicle, based on the imaging result, and outputs a recognition result; and
   a branching or merging road determination unit having a processor that determines, based on the recognition result, a presence or absence of branching or merging of roads,
   wherein
   the determination unit is configured to:
      estimate a traveling section where branching or merging of roads is probably present, and
      determine that no branching or merging of roads is present in a region in which there is a preceding vehicle traveling at a higher speed than the own vehicle, the region being a region of the estimated traveling section.

2. The branching and merging determination apparatus as set forth in claim 1, wherein the determination unit estimates a traveling section where there is a dashed line of uneven thickness drawn on a road surface as the traveling section where branching or merging of roads is probably present.

3. The branching and merging determination apparatus as set forth in claim 1, wherein the determination unit estimates a traveling section where a lane boundary line is absent as the traveling section where branching or merging of roads is probably present.

4. The branching and merging determination apparatus as set forth in claim 1, wherein the determination unit estimates, as the traveling section where branching or merging of roads is probably present, a traveling section that extends forward by a predetermined distance from a place where branching or merging of roads is detected.

5. The branching and merging determination apparatus as set forth in claim 1 further comprising an in-vehicle camera configured to capture an image of an environment of the own vehicle, wherein the target object recognition unit recognizes the target present in front of the own vehicle based on the image captured by the in-vehicle camera.

6. The branching and merging determination apparatus as set forth in claim 1 further comprising an in-vehicle radar configured to detect information about an environment of the own vehicle, wherein the target object recognition unit recognizes the target present in front of the own vehicle based on the information detected by the in-vehicle radar.

7. A branching and merging determination apparatus comprising:
   an in-vehicle imaging unit having a processor that images an environment of an own vehicle and output an imaging result;
   a target object recognition unit having a processor that recognizes a target object present in front of an own vehicle, based on the imaging result, and outputs a recognition result; and
   a branching or merging road determination unit having a processor that determines, based on the recognition result, a presence or absence of branching or merging of roads,
   wherein
   the determination unit is configured to
      estimate a traveling section where branching or merging of roads is probably present, and
      determine that no branching or merging of roads is present in a region in which there is an oncoming vehicle traveling in a direction opposite to a traveling direction of the own vehicle, the region being a region of the estimated traveling section.

8. The branching and merging determination apparatus as set forth in claim 7, wherein the determination unit estimates a traveling section where there is a dashed line of uneven thickness drawn on a road surface as the traveling section where branching or merging of roads is probably present.

9. The branching and merging determination apparatus as set forth in claim 7, wherein the determination unit estimates a traveling section where a lane boundary line is absent as the traveling section where branching or merging of roads is probably present.

10. The branching and merging determination apparatus as set forth in claim 7, wherein the determination unit estimates, as the traveling section where branching or merging of roads is probably present, a traveling section that extends forward by a predetermined distance from a place where branching or merging of roads is detected.

11. The branching and merging determination apparatus as set forth in claim 7 further comprising an in-vehicle camera configured to capture an image of an environment of the own vehicle, wherein the target object recognition unit recognizes the target present in front of the own vehicle based on the image captured by the in-vehicle camera.

12. The branching and merging determination apparatus as set forth in claim 7 further comprising an in-vehicle radar configured to detect information about an environment of the own vehicle, wherein the target object recognition unit recognizes the target present in front of the own vehicle based on the information detected by the in-vehicle radar.

13. A branching and merging determination apparatus comprising:
   an imaging unit having a processor that images an environment of an own vehicle and output an imaging result;
   a target object recognition unit having a processor that recognizes a target object present in front of an own vehicle, based on the imaging result, and outputs a recognition result; and
   a branching or merging road determination unit having a processor that determines, based on the recognition result, a presence or absence of branching or merging of roads,
   wherein
   the determination unit is configured to
      estimate a traveling section where branching or merging of roads is probably present, and
      determine that branching or merging of roads is present in a region in which there is a lane boundary line not parallel to a traveling direction of the own vehicle, the region being a region of the estimated traveling section.

14. The branching and merging determination apparatus as set forth in claim 13, wherein the determination unit estimates a traveling section where there is a dashed line of uneven thickness drawn on a road surface as the traveling section where branching or merging of roads is probably present.

15. The branching and merging determination apparatus as set forth in claim 13, wherein the determination unit estimates a traveling section where a lane boundary line is absent as the traveling section where branching or merging of roads is probably present.

16. The branching and merging determination apparatus as set forth in claim 13, wherein the determination unit estimates, as the traveling section where branching or merging of roads is probably present, a traveling section that extends forward by a predetermined distance from a place where branching or merging of roads is detected.

17. The branching and merging determination apparatus as set forth in claim 13 further comprising an in-vehicle camera configured to capture an image of an environment of the own vehicle, wherein the target object recognition unit recognizes the target present in front of the own vehicle based on the image captured by the in-vehicle camera.

18. The branching and merging determination apparatus as set forth in claim 13 further comprising an in-vehicle radar configured to detect information about an environment of the own vehicle, wherein the target object recognition unit recognizes the target present in front of the own vehicle based on the information detected by the in-vehicle radar.

19. A branching and merging determination apparatus comprising:
   an imaging unit having a processor that images an environment of an own vehicle and output an imaging result;
   a target object recognition unit having a processor that recognizes a target object present in front of an own vehicle, based on the imaging result, and outputs a recognition result; and
   a branching or merging road determination unit having a processor that determines, based on the recognition result, presence or absence of branching or merging of roads,
   wherein
   the determination unit is configured to
      estimate a traveling section where branching or merging of roads is probably present, and
      determine that branching of roads is present in a region in which the distance between two adjacent preceding vehicles in a left-right direction is greater than a predetermined value, the region being a region of the estimated traveling section.

20. The branching and merging determination apparatus as set forth in claim 19, wherein the determination unit estimates a traveling section where there is a dashed line of uneven thickness drawn on a road surface as the traveling section where branching or merging of roads is probably present.

21. The branching and merging determination apparatus as set forth in claim 19, wherein the determination unit estimates a traveling section where a lane boundary line is absent as the traveling section where branching or merging of roads is probably present.

22. The branching and merging determination apparatus as set forth in claim 19, wherein the determination unit estimates, as the traveling section where branching or merging of roads is probably present, a traveling section that extends forward by a predetermined distance from a place where branching or merging of roads is detected.

23. The branching and merging determination apparatus as set forth in claim 19 further comprising an in-vehicle camera configured to capture an image of an environment of the own vehicle, wherein the target object recognition unit recognizes the target present in front of the own vehicle based on the image captured by the in-vehicle camera.

24. The branching and merging determination apparatus as set forth in claim 19 further comprising an in-vehicle radar configured to detect information about an environment of the own vehicle, wherein the target object recognition unit recognizes the target present in front of the own vehicle based on the information detected by the in-vehicle radar.

25. A branching and merging determination apparatus comprising:
   an imaging unit having a processor that images an environment of an own vehicle and output an imaging result;
   a target object recognizer unit having a processor that recognizes a target object present in front of an own vehicle, based on the imaging result, and outputs a recognition result; and
   a branching or merging road determination unit having a processor that determines, based on the recognition result, presence or absence of branching or merging of roads,
   wherein
   the determination unit is configured to
      estimate a traveling section where branching or merging of roads is probably present, and determine that merging of roads is present in a region of the estimated traveling in which the distance between two adjacent preceding vehicles in a left-right direction is less than a predetermined value, the region being a region of the estimated traveling section.

26. The branching and merging determination apparatus as set forth in claim 25, wherein the determination unit estimates a traveling section where there is a dashed line of uneven thickness drawn on a road surface as the traveling section where branching or merging of roads is probably present.

27. The branching and merging determination apparatus as set forth in claim 25, wherein the determination unit estimates a traveling section where a lane boundary line is absent as the traveling section where branching or merging of roads is probably present.

28. The branching and merging determination apparatus as set forth in claim 25, wherein the determination unit estimates, as the traveling section where branching or merging of roads is probably present, a traveling section that extends forward by a predetermined distance from a place where branching or merging of roads is detected.

29. The branching and merging determination apparatus as set forth in claim 25 further comprising an in-vehicle camera configured to capture an image of an environment of the own vehicle, wherein the target object recognition unit recognizes the target present in front of the own vehicle based on the image captured by the in-vehicle camera.

30. The branching and merging determination apparatus as set forth in claim 25 further comprising an in-vehicle radar configured to detect information about an environment of the own vehicle, wherein the target object recognition unit recognizes the target present in front of the own vehicle based on the information detected by the in-vehicle radar.

* * * * *